US009927945B2

(12) United States Patent
Ryu et al.

(10) Patent No.: US 9,927,945 B2
(45) Date of Patent: Mar. 27, 2018

(54) ELECTRONIC DEVICE AND AUXILIARY APPARATUS AND METHOD OF PROCESSING AN OPERATION OF THE ELECTRONIC DEVICE

(71) Applicant: Samsung Electronics Co., Ltd., Gyeonggi-do (KR)

(72) Inventors: Seung-Tae Ryu, Seoul (KR); Il-Kwon Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 25 days.

(21) Appl. No.: 14/736,876

(22) Filed: Jun. 11, 2015

(65) Prior Publication Data

US 2016/0174274 A1    Jun. 16, 2016

(30) Foreign Application Priority Data

Dec. 16, 2014   (KR) .................. 10-2014-0181262

(51) Int. Cl.
*G06F 3/0481*   (2013.01)
*G06F 1/16*     (2006.01)
*G04G 17/08*    (2006.01)

(52) U.S. Cl.
CPC ............. *G06F 3/0481* (2013.01); *G06F 1/163* (2013.01); *G06F 1/1632* (2013.01); *G04G 17/08* (2013.01)

(58) Field of Classification Search
CPC ...... G06F 3/0481; G06F 1/163; G06F 1/1632; G04G 17/08
See application file for complete search history.

(56) References Cited

U.S. PATENT DOCUMENTS

| 6,154,010 A | 11/2000 | Geiger |
| 2008/0231111 A1 | 9/2008 | Hazani et al. |
| 2012/0135787 A1* | 5/2012 | Kusunoki ............ H04M 1/0214 455/575.8 |
| 2014/0282693 A1* | 9/2014 | Soundararajan ..... H04N 21/435 725/32 |
| 2015/0200540 A1* | 7/2015 | Draaijer .................. H02J 9/005 307/31 |
| 2016/0021098 A1* | 1/2016 | Dhanabalan ........ H04L 63/0823 726/8 |
| 2017/0098435 A1* | 4/2017 | Inagaki .................... G09G 5/37 |

FOREIGN PATENT DOCUMENTS

KR         1020010106261         11/2001

* cited by examiner

*Primary Examiner* — Omar Ghowrwal
(74) *Attorney, Agent, or Firm* — The Farrell Law Firm, P.C.

(57) ABSTRACT

A method of processing an operation of an electronic device is provided. The method includes identifying whether the electronic device is coupled to an auxiliary apparatus; and providing a user interface that uses data provided from the auxiliary apparatus.

15 Claims, 5 Drawing Sheets

ELECTRONIC DEVICE AND AUXILIARY APPARATUS AND METHOD OF PROCESSING AN OPERATION OF THE ELECTRONIC DEVICE

PRIORITY

This application claims priority under 35 U.S.C. § 119(a) to Korean Patent Application Serial No. 10-2014-0181262, which was filed in the Korean Intellectual Property Office on Dec. 16, 2014, the entire content of which is incorporated herein by reference.

BACKGROUND

1. Field of the Invention

The present invention generally relates to an electronic device and an auxiliary apparatus connected to the electronic device.

2. Description of the Related Art

In recent years, electronic devices have been developed into various forms such as wearable devices, for example, electronic watches (e.g., smart watches), head-mounted displays (HMD) (e.g., electronic glasses), electronic shoes, electronic clothes, or electronic tattoos, which may be worn or implanted into portions of the bodies of users, and devices that can be carried by users, such as tablet computers or smartphones.

Various methods for enhancing usage performance or design satisfaction by miniaturizing wearable devices have been studied, but it is still difficult to miniaturize the wearable devices due to the limits in the configuration of hardware or performance of processors basically required by the wearable devices.

SUMMARY

The present invention has been made to solve at least the above-mentioned problems and/or disadvantages and to provide at least the advantages described below.

Accordingly, an aspect of the present invention is to provide an apparatus which can minimize a configuration of hardware or performance of a processor basically required by a wearable device, and can extend a hardware configuration or function of the wearable device if necessary.

In accordance with an aspect of the present invention, a method of processing an operation of an electronic device is provided. The method includes identifying whether the electronic device is coupled to an auxiliary apparatus; and providing a user interface that uses data provided from the auxiliary apparatus.

In accordance with another aspect of the present invention, a method of processing an operation of an auxiliary apparatus is provided. The method includes providing an identification value required for identifying whether the auxiliary apparatus is coupled to an electronic device; and providing data required by a user interface displayed on the electronic device.

In accordance with another aspect of the present invention, an electronic device is provided, which includes a housing that has a structure detachably coupled to an auxiliary apparatus; and a processing unit configured to provide a first interface provided by the electronic device, to identify whether the electronic device is coupled to the auxiliary apparatus, and to provide a second user interface that uses data provided from the auxiliary apparatus.

In accordance with another aspect of the present invention, an auxiliary apparatus coupled to an electronic device is provided. The auxiliary apparatus includes a housing that has a structure detachably coupled to the electronic device, and configured to provide an identification value required for identifying whether the auxiliary apparatus is coupled to the electronic device; and a processing unit configured to provide data required by a user interface displayed on the electronic device.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF EMBODIMENTS OF THE PRESENT INVENTION

Figure 1:
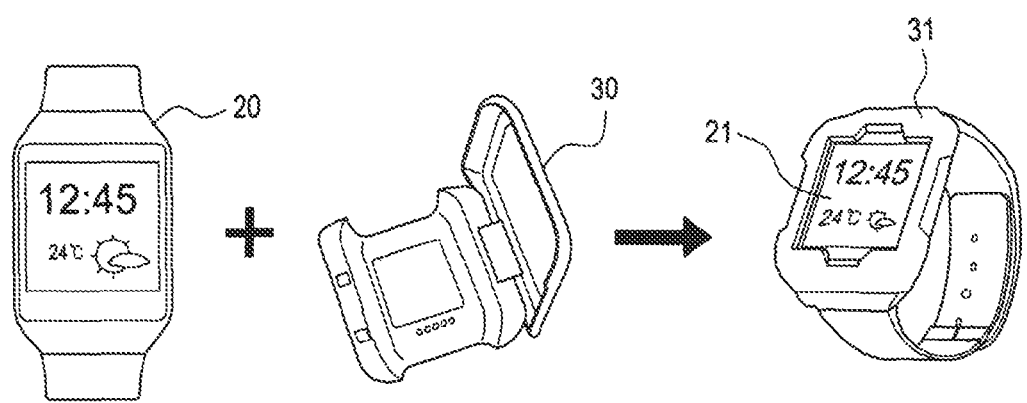
FIG. 1 is a perspective view illustrating an auxiliary apparatus and an electronic device connected to the auxiliary apparatus according to an embodiment of the present invention.

Hereinafter, the present invention will be described with reference to the accompanying drawings. Although specific embodiments are illustrated in the drawings and related detailed descriptions are discussed in the present disclosure, the present invention may have various modifications and several embodiments. Accordingly, the present invention is not limited to a specific implementation form and it should be understood that the present invention includes all changes or equivalents and substitutes included in the spirit and scope of the present invention. In connection with descriptions of the drawings, similar components are designated by the same reference numeral.

The expressions such as "include" and "may include" which may be used in the present disclosure denote the presence of the disclosed functions, operations, and constituent elements and do not limit one or more additional functions, operations, and constituent elements. Also, as used herein, the terms "include" and/or "have" should be construed to denote a certain feature, number, step, operation, element, component, or a combination thereof, and should not be construed to exclude the existence or possible addition of one or more other features, numbers, steps, operations, elements, components, or combinations thereof.

The expression "and/or" includes any and all combinations of the associated listed words. For example, the expression "A and/or B" may include A, may include B, or may include both A and B.

Expressions including ordinal numbers, such as "first" and "second", and the like, may modify various elements. However, such elements are not limited by the above expressions. For example, the above expressions do not limit the sequence and/or importance of the corresponding elements. The above expressions may be used merely for the purpose of distinguishing one element from the other elements. For example, a first user device and a second user device indicate different user devices although both of them are user devices. For example, a first element may be referred to as a second element, and similarly, a second element may be referred to as a first element without departing from the scope of the present invention.

When an element is referred to as being "coupled" or "connected" to any other element, it should be understood that not only may the element be directly coupled or connected to the other element, but also a third element may be interposed therebetween. Contrarily, when an element is referred to as being "directly coupled" or "directly connected" to any other element, it should be understood that no element is interposed therebetween. The terms used in the present disclosure are only used to describe specific embodiments, and are not intended to limit the present invention. As used herein, singular forms are intended to include plural forms as well, unless the context clearly indicates otherwise.

FIG. 1 is a perspective view illustrating an auxiliary apparatus and an electronic device connected to the auxiliary apparatus according to an embodiment of the present invention.

The electronic device 20 may be a wearable device detachably coupled to a portion of the user, and may provide a specific information element through at least one display 21. The auxiliary apparatus 30 is coupled to the electronic device 20. The auxiliary apparatus 30 may include a housing structure 31 configured to surround at least an area of the electronic device 20. The housing structure 31 may be provided such that at least the display 21 is exposed while the electronic device 20 and the auxiliary apparatus 30 are coupled. For example, the above-mentioned apparatus 30 may be an apparatus coupled to the electronic device 20 in the form of a cradle.

Figure 2:
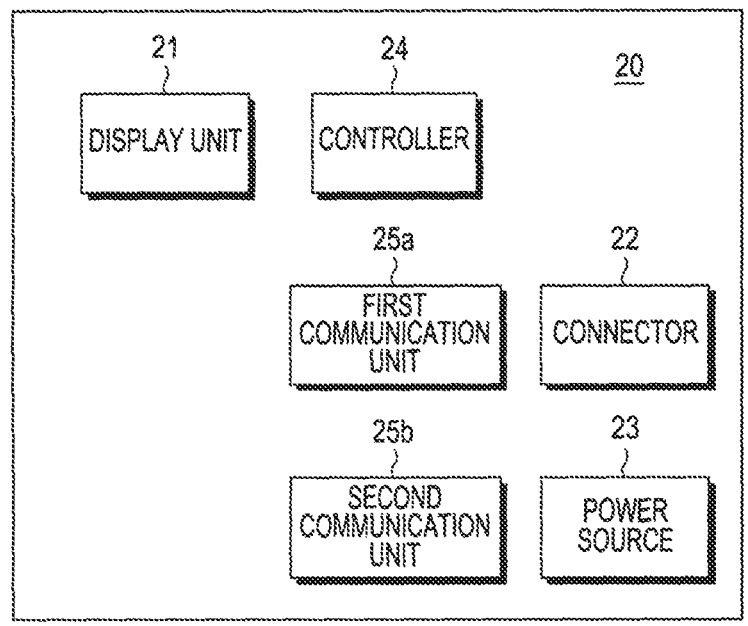
FIG. 2 is a block diagram illustrating a configuration of an electronic device connected to an auxiliary apparatus according to an embodiment of the present invention.
Figure 3:
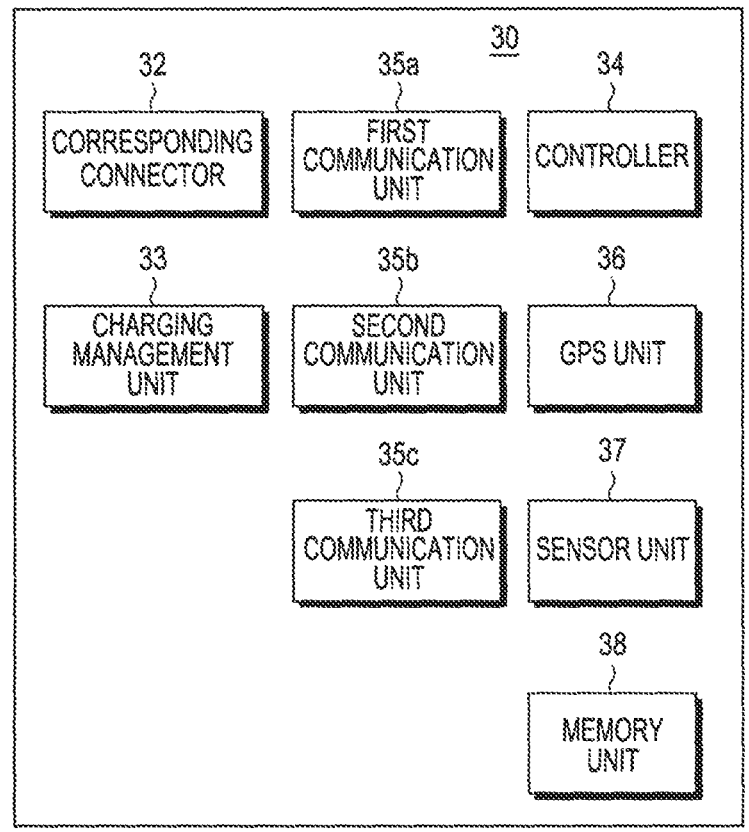
FIG. 3 is a block diagram illustrating a configuration of an auxiliary apparatus according to an embodiment of the present invention.

FIG. 2 is a block diagram illustrating a configuration of an electronic device connected to an auxiliary apparatus according to an embodiment of the present invention. FIG. 3 is a block diagram illustrating a configuration of an auxiliary apparatus according to an embodiment of the present invention.

The electronic device 20 includes a display unit 21, a connector 22, a power source 23, a controller 24, and communication units 25a and 25b. The connector 22 may include a connection terminal, which is physically connected to the auxiliary apparatus so that the electronic device can receive data or electric power provided from the auxiliary apparatus. In another embodiment of the present invention, the electronic device may include a data transceiver circuit or a wireless power transceiver circuit that is connected to the auxiliary apparatus in a noncontact manner to receive data or electric power.

The power source 23 provides electric power necessary for driving of components included in the electronic device, and for example, may include a battery. The power source 23 may include a charging control circuit that may supply electric power provided from the outside to the power source 23 to perform a charging operation.

The controller 24 provides a signal or instructions necessary for controlling operations of the components included in the electronic device 20, provides information generated during driving of the electronic device 20, or receives information necessary for driving the electronic device.

In particular, the connector 22 may include a terminal that physically contacts a corresponding connector 32 included in the auxiliary apparatus 30. The connector 22 provides the controller 24 with a voltage (or current) value input through the terminal. Accordingly, the controller 24 identifies the type of the auxiliary apparatus 30 through a voltage (or current, resistance, or data) value provided from the terminal of the connector 22. For example, the controller 24 may identify the voltage (or current, resistance, or data) value provided from the terminal of the connector 22, and identify the type of the auxiliary apparatus 30 corresponding to the voltage (or current, resistance, or data) value.

The communication units 25a and 25b may include a first communication unit 25a connected to the auxiliary apparatus 30 through a predetermined communication scheme to transmit and receive data to and from the auxiliary apparatus 30. The auxiliary apparatus 30 is coupled to the electronic device 20, and accordingly, a communication scheme through which the electronic device 20 and the auxiliary apparatus 30 are connected to each other may be any communication scheme in which the electronic device 20 and the auxiliary apparatus 30 may perform communications within several centimeters. In an embodiment of the present invention, for example, the predetermined communication scheme may include a short-range communication scheme such as Bluetooth®, Radio-Frequency IDentification (RFID), Near Field Communication (NFC), Bluetooth® Low Energy (BLE), or WiFi-Direct. Furthermore, the predetermined communication scheme may include a communication scheme performed through a physical contact. For example, the communication scheme implemented through a physical contact may include a communication scheme employing a POGO Pin and a communication scheme such as Universal Serial Bus (USB) or Micro USB. The communication units 25a and 25b may further include a second communication unit 25b, and the second communication unit 25b transmits and receives information necessary for allowing the first communication unit 25a to process a connection with the auxiliary apparatus 30. For example, the first communication unit 25a may process Bluetooth® communication, and the second communication unit 25b may process NFC communication. The second communication unit 25b may provide the auxiliary apparatus 30 with information for requesting initiation of an operation of the Bluetooth® communication, security authentication information, and the like. Accordingly, the first communication unit 25a does not require a separate user input for initiating communication, and may actively process a communication connection with the auxiliary apparatus 30 as the electronic device 20 is coupled to the auxiliary apparatus 30.

The first communication unit 25a may include data provided from the auxiliary apparatus 30, for example, sensor data provided from a heart rate sensor, a temperature sensor, or a humidity sensor, and location data identified based on a Global Positioning System (GPS) signal. The first communication unit 25a may receive data received through a communication scheme (for example, a cellular communication scheme such as 3G, Wideband Code Division Multiple Access (WCDMA), or Long Term Evolution (LTE)) that is not supported by the electronic device 20 from the auxiliary apparatus 30, and may provide the auxiliary apparatus 30 data that will be transmitted through a communication scheme (for example, a cellular communication scheme such as 3G, WCDMA, or LTE) that is not supported by the electronic device 20.

The controller 24 provides a first user interface for providing a function of the electronic device 20. The first user interface may be a user interface for providing a basic function provided by the electronic device 20. For example, the electronic device 20 may be a wearable device such as a smart watch, and the first user interface may provide the electronic device 20 with a watch function that is a basic function of a wearable device, such as a smart watch. The controller 24 provides a second user interface based on data provided by the auxiliary apparatus 30. The second user interface may be an interface provided based on data provided by the auxiliary apparatus 30. For example, the second interface may include a user interface that uses sensor data provided from a heart rate sensor, a temperature sensor, a humidity sensor, or the like, a user interface that uses location data identified based on a GPS signal, and a user interface that uses data received through a communication scheme (for example, a cellular communication scheme such as 3G, WCDMA, or LTE) that is not supported by the electronic device 20.

The auxiliary apparatus 30 includes a housing structure 31 (see FIG. 1), a corresponding connector 32, a charging management unit 33, a controller 34, and communication units 35a, 35b, and 35c. The auxiliary apparatus 30 may further include a GPS unit 36 and a sensor unit 37.

The housing structure 31 includes a structure for surrounding at least an area of the electronic device 20. The housing structure 31 may receive the electronic device 20 therein, and may be provided as a waterproof structure such that liquid cannot be introduced into a space in which the electronic device 20 is received.

The corresponding connector 32 may include a terminal provided in a place corresponding to the place in which the connector 22 of the electronic device 20 is included, for physically contacting the connector 22 such that the corresponding connector 32 is connected to the connector 22. In another embodiment of the present invention, the corresponding connector 32 may be connected to the auxiliary apparatus in a noncontact scheme and may be provided in an element to which data or electric power is provided. The corresponding connector 32 may provide an identification value by which the type of the auxiliary apparatus 30 can be identified. The identification value may include a voltage (or current) value of a predetermined magnitude according to the type of the auxiliary apparatus 30.

The charging management unit 33 provides the electronic device 20 with charging power. For Example, the charging management unit 33 may include a battery, and may provide the electronic device with electric power provided from the battery as the charging power. As another example, the charging management unit 33 may include a charging control circuit, and the charging control circuit may provide the electronic device 20 with electric power provided from the outside as the charging power. It is apparent that the charging management unit 33 may provide the electronic device with charging power in a wired or wireless scheme.

The controller 34 provides a signal or an instruction necessary for controlling operations of the components included in the auxiliary apparatus 30, provides information generated during driving of the auxiliary apparatus 30, or receives information necessary for driving the auxiliary apparatus 30.

The communication unit includes a first communication unit 35a connected to the electronic device 20 through a predetermined communication scheme to transmit and receive data to and from the electronic device 20. The auxiliary apparatus 30 is coupled to the electronic device 20, and accordingly, a communication scheme through which the electronic device 20 and the auxiliary apparatus 30 are connected to each other may be any communication scheme in which the electronic device 20 and the auxiliary apparatus 30 may perform communications within several centimeters. In an embodiment of the present invention, for example, the predetermined communication scheme may include a short-range communication scheme such as Bluetooth®, RFID, NFC, BLE, or WiFi-Direct. Furthermore, the predetermined communication scheme may include a communication scheme performed through physical contact. For example, the communication scheme implemented through physical contact may include a communication scheme employing a POGO Pin and a communication scheme such as USB or Micro USB.

The first communication unit 35a receives data provided from the components (for example, the GPS unit 36 and the sensor unit 37) included in the auxiliary apparatus 30, for example, sensor data provided from a heart rate sensor, a temperature sensor, a humidity sensor, and the like, and location data identified based on a GPS signal, and the data may be transmitted to the electronic device 20.

The auxiliary apparatus 30 may provide the electronic device 20 with data provided from the GPS unit 36 and the sensor unit 37 that are not included in the electronic device 20, for example, sensor data provided from a heart rate sensor, a temperature sensor, a humidity sensor, and the like, and location data identified based on a GPS signal. The electronic device 20 may be controlled to use data provided from the GPS unit 36 and the sensor unit 37 that are not included in the electronic device 20, for example, sensor data provided from a heart rate sensor, a temperature sensor, a humidity sensor, and the like, and location data identified based on a GPS signal when the auxiliary apparatus 30 is coupled to the electronic device 20. Accordingly, the user may selectively couple the auxiliary apparatus 30 to the electronic device 20 if necessary. That is, when data provided from a GPS unit 36 and a sensor unit 37 that are not included in the electronic device 20, for example, sensor data provided from a heat rate sensor, a temperature sensor, a humidity sensor, and the like, location data identified based on a GPS signal, and the like are not necessary, the user may employ or carry only the electronic device 20 that is configured more simply without being coupled with the auxiliary apparatus 30, or may couple with the auxiliary apparatus 30 if necessary, thereby achieving an advantageous effect of extending a function that may be processed by the electronic device 20.

The communication unit may further include a second communication unit 35b, and the second communication unit 35b transmits and receives information necessary for allowing the first communication unit 35a to process a connection with the electronic device 20. For example, the first communication unit 35a may process a Bluetooth® communication, and the second communication unit 35b may process an NFC communication. The second communication unit 35b may receive information for requesting initiation of an operation of the Bluetooth® communication, security authentication information, and the like from the electronic device 20. The second communication unit 35b may provide the controller 34 with information for requesting initiation of an operation of the Bluetooth® communication and authentication information, and the controller 34 may identify security authentication information to control an operation of the first communication unit 35a. The first communication unit 35a may then perform communication with the first communication unit 25a included in the electronic device 20. Accordingly, the first communication unit 35a does not require a separate user input for initiating communication, and may process a communication connection with the electronic device 20 based on information provided by the electronic device 20 through the second communication unit 35b.

The communication unit may further include a third communication unit 35c. The third communication unit 35c performs communication through a communication scheme that is not supported by the electronic device 20. For example, the communication scheme that is not supported by the electronic device 20 may include a cellular communication method such as 3G, WCDMA, or LTE.

The third communication unit 35c transmits the data received through the communication scheme that is not supported by the electronic device 20 to the first communication unit 35a, and the first communication unit 35a transmits the received data to the electronic device 20. The first communication unit 35a receives data that will be transmitted through the third communication unit 35c, from the electronic device 20. Accordingly, the first communication unit 35a transmits data that will be transmitted through the third communication unit 35c to the third communication unit 35c, and the third communication unit 35c transmits the data to a destination through a communication scheme that is not supported by the electronic device 20.

Accordingly, the auxiliary apparatus 30 provides the electronic device 20 with data provided from a component (for example, a communication unit for processing a cellular communication scheme such as 3G, WCDMA, LTE) that is not included in the electronic device 20, for example, cellular communication data. Accordingly, the electronic device 20 uses data provided from a component (for example, a communication unit for processing a cellular communication scheme such as 3G, WCDMA, LTE) that is not included in the electronic device 20, for example, cellular communication data when the auxiliary apparatus 30 is coupled to the electronic device 20. The user may selectively couple the auxiliary apparatus 30 to the electronic device 20 if necessary. That is, when data provided from a component (for example, a communication unit for processing a cellular communication scheme such as 3G, WCDMA, LTE) that is not included in the electronic device 20, for example, cellular communication data are not necessary, the user may employ or carry only the electronic device that is configured more simply without being coupled with the auxiliary apparatus 30, or may achieve an advantageous effect of extending a function that can be processed by the electronic device 20 when the auxiliary apparatus 30 is coupled to the electronic device 20.

The auxiliary apparatus 30 may further include a memory unit 38. The memory unit 38 may be connected to the electronic device 20 through the corresponding connector 32. The memory unit 38 (or the controller 34) may support a memory extension function, and the electronic device 20 may use the memory unit 38 as an extension memory.

According to the embodiment of the present invention, the auxiliary apparatus 30 may further include a communication unit for processing a cellular communication scheme such as 3G, WCDMA, or LTE, a GPS processing unit, or a sensor unit that is not included in the electronic device 20, and may provide the electronic device 20 with data identified through the components. The auxiliary apparatus 30 may provide the components with data provided from the electronic device 20, or may control the components. Accordingly, the user may selectively couple the auxiliary apparatus 30 to the electronic device 20 if necessary. That is, when data provided from the components that are not included in the electronic device 20 are not necessary, the user may employ or carry only the electronic device 20 that is configured more simply without being coupled with the auxiliary apparatus 30, or may extend a function that can be processed by the electronic device 20 when the auxiliary apparatus 30 is coupled to the electronic device 20.

When the electronic device 20 is not coupled to the auxiliary apparatus 30, the electronic device 20 may provide the first user interface that provides a basic function. For example, the electronic device 20 may be a wearable device such as a smart watch, and the first user interface may provide the electronic device 20 with a watch function that is a basic function of a wearable device such as a smart watch.

When the electronic device 20 is coupled to the auxiliary apparatus 30, the controller 24 may provide a second user interface based on data provided by the auxiliary apparatus 30. The second user interface may be an interface provided based on data provided by the auxiliary apparatus 30. For example, the second interface may include a user interface that uses sensor data provided from a heart rate sensor, a temperature sensor, a humidity sensor, or the like, a user interface that uses location data identified based on a GPS signal, and a user interface that uses data received through a cellular communication scheme such as 3G, WCDMA, or LTE that is not supported by the electronic device 20.

Moreover, the electronic device 20 may receive data provided by the auxiliary apparatus 30, and may configure and provide the second user interface using the received data. As another example, the auxiliary apparatus 30 may configure the second interface using a user interface that uses sensor data provided from a heart rate sensor, a temperature sensor, a humidity sensor, or the like, a user interface that uses location data identified based on a GPS signal, and a user interface that uses data received through a cellular communication scheme such as 3G, WCDMA, or LTE that is not supported by the electronic device 20, and may provide the electronic device 20 with the above-configured second interface.

Figure 4:
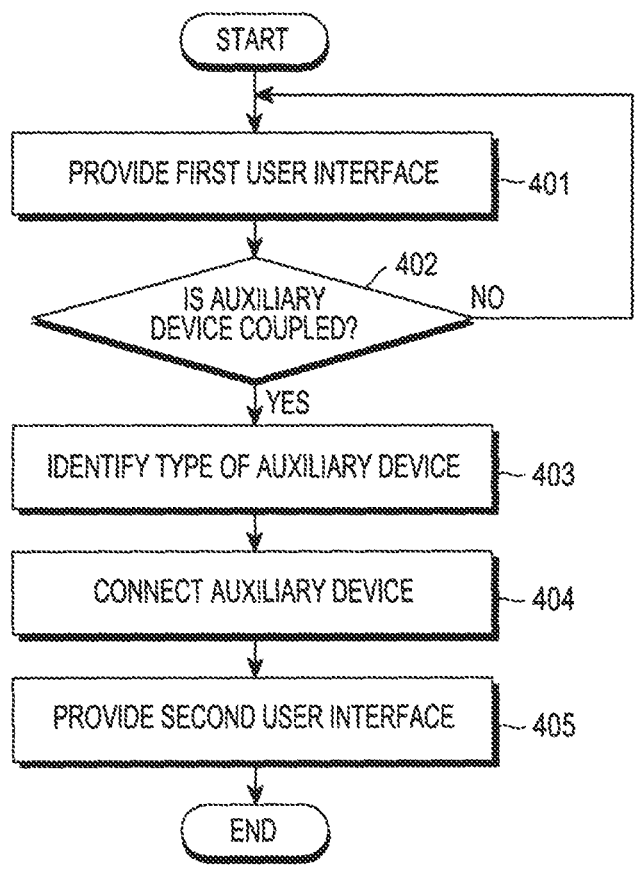
FIG. 4 is a flowchart illustrating a sequence of a method of controlling an operation of an electronic device according to an embodiment of the present invention.
Figure 5A:
FIG. 5A is an example of a view of a first interface provided in a method of controlling an operation of an electronic device according to an embodiment of the present invention.
Figure 5B:
FIG. 5B is an example of a view of a second interface provided in a method of controlling an operation of an electronic device according to an embodiment of the present invention.

FIG. 4 is a flowchart illustrating a sequence of a method of controlling an operation of an electronic device according to an embodiment of the present invention. FIG. 5A is an example of a view of a first interface provided in a method of controlling an operation of an electronic device according to an embodiment of the present invention. FIG. 5B is an example of a view of a second interface provided in a method of controlling an operation of an electronic device according to an embodiment of the present invention.

Referring to FIG. 4, the electronic device according to an embodiment of the present invention provides a first interface for providing a basic function of the electronic device in step 401. For example, when the above-mentioned electronic device is a wearable device such as a smart watch, a user interface illustrated in FIG. 5A is provided as the first user interface.

Here, the auxiliary apparatus may or may not be mounted or coupled to the electronic device while the electronic device provides the first user interface. The electronic device may be operated while the operating mode thereof is differently set according to a mounting state or coupling state of the auxiliary apparatus. Accordingly, in step 402, the electronic device identifies or detects whether the auxiliary apparatus is coupled. For example, the electronic device may include a terminal physically connected to the auxiliary apparatus, and the electronic device may identify whether the auxiliary apparatus is coupled, by detecting an input of an identification value (for example, a voltage, current, resistance, data value) through the terminal. As another example, the electronic device may detect whether the auxiliary apparatus is coupled, using a communication scheme by which the electronic device may perform communication at a relatively close distance, for example, a NFC communication scheme. For example, when NFC communication data is provided to the electronic device through the NFC communication scheme, it may be identified whether the auxiliary apparatus is coupled. As another example, the communication scheme may include a communication scheme performed through a physical contact, for example, a communication scheme employing a POGO Pin and a communication scheme such as USB or Micro USB.

When it is identified or detected that the electronic device is coupled to the auxiliary apparatus, the type of the auxiliary apparatus coupled to the electronic device is identified in step 403, and a communication connection between the electronic device and the auxiliary apparatus is established in step 404.

Step 403 and step 404 may be performed based on step 402. For example, when it is identified that the auxiliary apparatus is coupled using a terminal by which the electronic device is physically connected to the auxiliary apparatus, the electronic device may identify the type of the auxiliary apparatus by identifying the identification value (for example, a voltage or current value) detected through the terminal. In detail, the electronic device may predefine an identification value according to the type of the auxiliary apparatus and store the predefined identification value. The electronic device may then process an operation of identifying the type of the auxiliary apparatus corresponding to the identification value (for example, a voltage or current value, and a resistance or data value) detected through the terminal. The electronic device may then process a communication connection through the terminal. For example, the terminal may include a terminal included based on a micro USB scheme, or a terminal included based on a POGO communication scheme, and the electronic device may process a communication connection based on the micro USB scheme or a POGO communication scheme.

As another example, the electronic device may detect whether the auxiliary apparatus is coupled, using a communication scheme by which the electronic device may perform communication at a relatively close distance, for example, an NFC communication scheme. In this case, when it is detected that the auxiliary apparatus is coupled, in step 403, the electronic device may exchange information on the type of the auxiliary apparatus, before connecting communication with the auxiliary apparatus using a NFC communication scheme. In step 404, the electronic device may process a connection with the auxiliary apparatus through a NFC communication scheme. In step 404, the electronic device may also process a connection with the auxiliary apparatus through a wireless communication scheme such as a Bluetooth® communication scheme, an RFID communication scheme, a BLE communication scheme, a WiFi-Direct communication scheme, or a wired communication scheme such as POGO Pin, USB, or Micro USB. Although a scheme of connecting the electronic device and the auxiliary apparatus has been illustrated in various embodiments of the present invention, it is apparent that the present invention may be variously modified by those skilled in the art to which the present invention pertains.

In step 405, the electronic device provides a second user interface, for example, the second user interface illustrated in FIG. 5B. The second user interface may be an interface that can process hardware that is not included in the electronic device, or a function that is not supported by the electronic device.

The second interface may be an interface that is generated based on data provided from the auxiliary apparatus. For example, the second interface may include a user interface that uses sensor data provided from a heart rate sensor, a temperature sensor, a humidity sensor, or the like, a user interface that uses location data identified based on a GPS signal, and a user interface based on data received through a cellular communication scheme such as 3G, WCDMA, or LTE that is not supported by the electronic device. The auxiliary apparatus may configure the second interface or provide the data necessary for configuring the second interface, and the electronic device may receive the second interface to process an operation of displaying the second interface, or receive the data necessary for configuring the second interface to process an operation of configuring the second interface.

Figure 6:
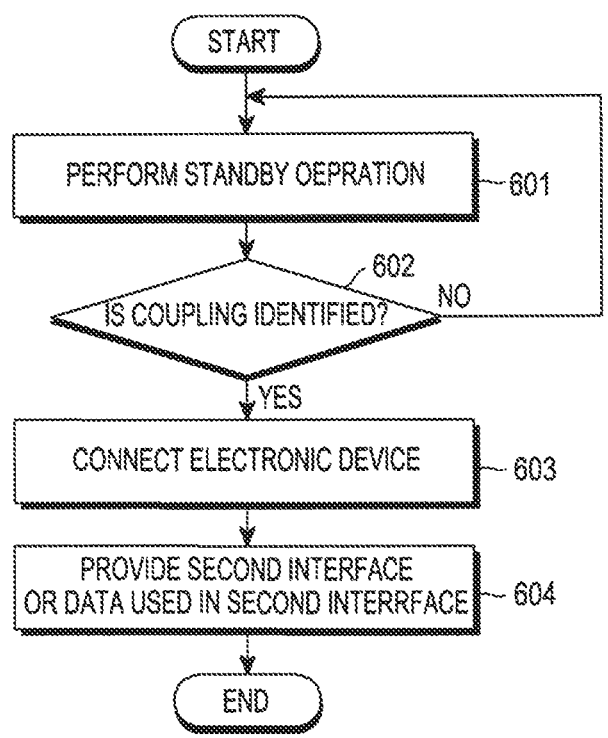
FIG. 6 is a flowchart illustrating a sequence of a method of processing an operation of an auxiliary apparatus according to an embodiment of the present invention.

FIG. 6 is a flowchart illustrating a sequence of a method of processing an operation of an auxiliary apparatus according to an embodiment of the present invention.

Referring to FIG. 6, the auxiliary apparatus performs a standby operation when the electronic device is not coupled in step 601. The auxiliary apparatus identifies or detects whether the electronic device is coupled in step 602. For example, the auxiliary apparatus may include a terminal that may physically contact the electronic device, and as the terminal is coupled to the electronic device, a circuit included in the connector of the auxiliary apparatus may form a closed loop through a circuit included in the electronic device. A current provided by the circuit included in the connector of the auxiliary apparatus may then be introduced into the auxiliary apparatus again through the electronic device, and as a predetermined magnitude of current is introduced into the circuit included in the connector of the auxiliary apparatus, the auxiliary apparatus may detect the coupling of the electronic device. As another example, the auxiliary apparatus may detect whether the electronic device is coupled, using a communication scheme by which the electronic device may perform communication at a relatively close distance, for example, an NFC communication scheme.

When it is identified or detected that the electronic device is coupled to the auxiliary apparatus, in step 603, the auxiliary apparatus processes a communication connection with the electronic device.

For example, the auxiliary apparatus may process a communication connection through the terminal that may physically contact the electronic device. The terminal may include a terminal included based on a micro USB scheme, or a terminal included based on a POGO communication scheme, and the auxiliary apparatus may process communication connection based on the micro USB scheme or a POGO communication scheme.

As another example, the auxiliary may detect whether the electronic device is coupled, using a communication scheme by which the electronic device may perform communication at a relatively close distance, for example, an NFC communication scheme. In this case, in step 603, the auxiliary apparatus may exchange information on the type of the auxiliary apparatus, before connecting a communication with the electronic device using an NFC communication scheme, and then process a connection with the electronic device through an NFC communication scheme. In step 603, the auxiliary apparatus may also process a connection with the electronic device through a wireless communication scheme such as a Bluetooth® communication scheme, an RFID communication scheme, a BLE communication scheme, a WiFi-Direct communication scheme, or a wired communication scheme such as POGO Pin, USB, or Micro USB. Although a scheme of connecting the electronic device and the auxiliary apparatus has been illustrated in various embodiments of the present invention, it is apparent that the present invention may be variously modified by those skilled in the art to which the present invention pertains.

In step 604, the auxiliary apparatus provides a second user interface, for example, the second user interface illustrated in FIG. 5B. The second user interface may be an interface that can process hardware that is not included in the electronic device, or a function that is not supported by the electronic device.

The second interface may include a user interface that uses sensor data provided from a heart rate sensor, a temperature sensor, a humidity sensor, or the like, a user interface that uses location data identified based on a GPS signal, and a user interface based on data received through a cellular communication scheme such as 3G, WCDMA, or LTE that is not supported by the electronic device.

For example, the auxiliary apparatus may generate and provide the second interface that will be displayed on the electronic device. As another example, the auxiliary apparatus may provide data necessary for configuring the second interface to the electronic device, and the electronic device may configure the second interface using the data received from the auxiliary apparatus to display the configured second interface.

Thus, in step 604, the auxiliary apparatus may process an operation of providing the electronic device with the configured second interface or sensor data provided from a heart rate sensor, a temperature sensor, a humidity sensor, or the like, a user interface that uses location data identified based on a GPS signal, and a user interface based on data received through a cellular communication scheme such as 3G, WCDMA, or LTE that is not supported by the electronic device.

As described above, according to the electronic device and the method of processing an operation of the electronic device according to various embodiments of the present invention, an advantageous effect of variously extending a function and a performance of the electronic device can be achieved by coupling an auxiliary apparatus including hardware that is not included in the electronic device or including a processing operation to the electronic device having a limit in processing an operation thereof and providing data provided by the auxiliary apparatus to the electronic device. For example, when the auxiliary apparatus includes a communication modem for processing a signal according to a 3GPP communication schemer, the electronic device may extend and process an operation, such as a phone call function, a text message transmission/reception function, a media streaming play function, or a data communication function. As another example, when the auxiliary apparatus includes a GPS module for processing a GPS signal, a location tracking function or an operation of a location based application may be extended and processed. As yet another example, when the auxiliary apparatus includes a heart rate sensor, or a sensor for measuring temperature or humidity, the health of the user may be identified or an operation of an application for providing a health care service may be extended and processed.

In addition, the auxiliary apparatus can improve the performance of the electronic device by providing a hardware configuration included in the electronic device. For example, the auxiliary apparatus may include a memory for storing data, a battery for providing electric power required for driving the electronic device, or an external interface terminal (for example, an Audio Visual (AV) output terminal, a USB terminal, or a micro USB terminal). Accordingly, an advantageous effect of improving or extending various performances or functions that are not supported by the electronic device can be achieved simply by coupling the auxiliary apparatus to the electronic device.

According to various embodiments of the present invention, an auxiliary apparatus including the hardware or processing unit that is not included in an electronic device can be coupled to the electronic device.

Furthermore, a function or performance of the electronic device can be variously extended by providing the electronic device with data provided by the auxiliary apparatus.

In addition, the auxiliary apparatus can improve the performance of the electronic device by additionally providing a hardware configuration that is not included in the electronic device.

Although certain embodiments are described in the above description of the present invention, various modifications can be made without departing from the scope of the present invention. Accordingly, the scope of the present invention shall not be determined by the above-described embodiments, and is to be determined by the appended claims and their equivalents.

What is claimed is:

1. A method of processing an operation of an electronic device,
the method comprising:
identifying whether the electronic device is physically connected to an auxiliary apparatus;
identifying the auxiliary apparatus through an electrical signal from the auxiliary apparatus;
displaying a first user interface on the electronic device; and
displaying a second user interface on the electronic device by configuring the second user interface based on sensor data provided by the auxiliary apparatus.

2. The method of claim 1, wherein identifying whether the electronic device is physically connected to the auxiliary apparatus comprises identifying a value provided from a terminal that contacts the auxiliary apparatus to identify whether the electronic device is physically connected to the auxiliary apparatus.

3. The method of claim 1, wherein identifying whether the electronic device is physically connected to the auxiliary apparatus comprises:
identifying an identification value provided from a terminal that contacts the auxiliary apparatus to identify whether the electronic device is physically connected to the auxiliary apparatus; and
identifying the type of the auxiliary apparatus corresponding to the identification value.

4. The method of claim 1, wherein the second user interface is a user interface generated by the electronic device by using data received through a cellular communication supported by the electronic device and a near field communication not supported by the electronic device, or generated by the auxiliary apparatus by using data collected by at least one sensor included in the auxiliary apparatus.

5. A method of processing an operation of an auxiliary apparatus, the method comprising:
providing an electrical signal required for identifying whether the auxiliary apparatus is physically connected to an electronic device; and
providing data required by a user interface displayed on the electronic device,
wherein the data required by the user interface displayed on the electronic device comprises sensor data acquired by at least one sensor.

6. The method of claim 5, further comprising:
generating a second user interface based on the data; and
providing the electronic device with the second user interface.

7. The method of claim 6, wherein the second user interface is a user interface generated by the electronic device by using data received through a cellular communication supported by the electronic device and a near field communication not supported by the electronic device, or generated by the auxiliary apparatus by using data collected by at least one sensor included in the auxiliary apparatus.

8. An electronic device comprising:
a housing that has a structure detachably physically connected to an auxiliary apparatus;
a display; and
a processor configured to control the display to display a first interface provided by the electronic device, to identify whether the electronic device is physically connected to the auxiliary apparatus, and to control the display to display a second user interface that uses sensor data provided by the auxiliary apparatus.

9. The electronic device of claim 8, wherein the housing comprises a terminal that contacts the auxiliary apparatus when the electronic device is physically connected to the auxiliary apparatus, and the processing unit is further configured to identify the auxiliary apparatus by identifying an identification value provided through the terminal.

10. The electronic device of claim 8, wherein the second user interface is a user interface generated by the electronic device by using data received through a cellular communication supported by the electronic device and a near field communication not supported by the electronic device, or generated by the auxiliary apparatus by using data collected by at least one sensor included in the auxiliary apparatus.

11. An auxiliary apparatus comprising:
a housing that has a structure detachably physically connected to an electronic device, and configured to provide an electrical signal required for identifying whether the auxiliary apparatus is physically connected to the electronic device;
a sensor unit;
a communication unit; and
a processor configured to control the communication unit to transmit data required by a user interface displayed on the electronic device,
wherein the data required by the user interface displayed on the electronic device comprises data provided by the sensor unit.

12. The auxiliary apparatus of claim 11, wherein the communication unit is included in the housing.

13. The auxiliary apparatus of claim 12, wherein the communication unit comprises:
a first communication unit configured to perform communication with the electronic device using a cellular communication; and
a second communication unit configured to use a near field communication.

14. The auxiliary apparatus of claim 13, wherein the data required by the user interface displayed on the electronic device comprises data transmitted and received through the second communication unit.

15. The auxiliary apparatus of claim 11, wherein the housing has a receiving space that accommodates at least a portion of the electronic device, and a waterproof structure that prevents introduction of liquid into the receiving space.

* * * * *